United States Patent [19]
Girgis et al.

[11] Patent Number: 4,762,750
[45] Date of Patent: *Aug. 9, 1988

[54] FLEXIBLE, CHEMICALLY TREATED BUNDLES OF FIBERS AND PROCESS

[75] Inventors: Mikhail M. Girgis, Pittsburgh; Ernest L. Lawton, Allison Park, both of Pa.

[73] Assignee: PPG Industries, Inc., Pittsburgh, Pa.

[*] Notice: The portion of the term of this patent subsequent to May 5, 2004 has been disclaimed.

[21] Appl. No.: 21,534

[22] Filed: Feb. 26, 1987

Related U.S. Application Data

[63] Continuation of Ser. No. 865,597, May 22, 1986, abandoned, which is a continuation of Ser. No. 535,952, Jul. 30, 1984, abandoned.

[51] Int. Cl.$^4$ .............................................. D02G 3/00
[52] U.S. Cl. .................................... 428/378; 428/375; 428/391; 428/392; 428/394; 428/395; 65/3.41; 65/3.43; 65/3.44
[58] Field of Search ............... 428/375, 378, 391, 392, 428/394, 395; 65/3.41, 3.43, 3.44

[56] References Cited

U.S. PATENT DOCUMENTS

| | | | |
|---|---|---|---|
| 2,893,892 | 7/1959 | Pinte et al. | 427/407.3 |
| 3,189,578 | 6/1965 | Kuemmerer et al. | 460/77.5 |
| 3,298,854 | 1/1967 | Marzocchi et al. | 427/407.3 |

(List continued on next page.)

FOREIGN PATENT DOCUMENTS 51-68678  6/1976  Japan .

OTHER PUBLICATIONS

Investigation of the Effect of Coatings on the Failure Mechanisms of Fiberglass Yarn in Tubular Reverse Osmosis Supports by National Technical Information Service at pp. 5-8, 25-29, 32-37 and 47 and 52-53, (United States Department of the Interior).

"A Fourier Transform Infra-Red Study of the Phase Behaviour of Polymer Blends, Ethylene-Vinyl Acetate Blends with Poly(Vinyl Chloride) and Chlorinated Polyethylene", Polymer, 1983, vol. 24, Nov., pp. 1410-1414.

"High Performance Coated Fabrics of Kevlar ® Aramid Fiber", Journal of Coated Fabrics, vol. 7, Jul., 1977, pp. 3-23.

"Architectural PTFE-Coated Glass Fabrics-Their Structure and Limitations", M. P. Ansell et al., School of Materials Science, University of Bath, Claverton Down, Bath, England, Textile Research Journal, Nov., 1983, pp. 692-700.

"Utilization of Vinyl Coated Synthetic Fabrics in Industrial Applications", Richard N. Seaman, Balakrishman Venkataraman, Journal of Coated Fabrics, vol. 5, Apr., 1976.

*Primary Examiner*—Sharon A. Gibson
*Attorney, Agent, or Firm*—Kenneth J. Stachel

[57] ABSTRACT

More flexible bundles of high modulus, low elongation fibers are produced by the impregnated bundles and process of the present invention. The flexible bundle of fibers comprise a plurality of fibers having a first treatment of a moisture-reduced residue of an aqueous chemical composition and a second treatment of a moisture-reduced, partially cured impregnant of an aqueous chemical coating composition. The individual fibers in the impregnated bundle were first treated with an aqueous sizing composition having at least a fiber protectorant and optionally an antistatic agent and/or coupling agent. The impregnating composition has one or more water soluble, dispersible or emulsifiable elastomeric polymers that are essentially free of hydrocarbon diene and chlorine functionalities, and one or more crosslinking materials that are water soluble, emulsifiable or dispersible, and water. Optionally, there may be present one or more emulsifiable or dispersible lubricants, plasticizers, polymeric materials, waxes, diene-containing latices and flame retardants. The flexible impregnated bundles of glass fibers are useful in producing woven and nonwoven fabrics where the fabrics can be coated with polymeric films.

47 Claims, 2 Drawing Sheets

U.S. PATENT DOCUMENTS

| | | | |
|---|---|---|---|
| 3,318,757 | 5/1967 | Atwell | 65/3.41 |
| 3,364,059 | 1/1968 | Marzocchi | 427/389.8 X |
| 3,395,071 | 7/1968 | Nitzsche et al. | 162/156 |
| 3,427,192 | 2/1969 | Bolinger | 117/139.5 |
| 3,432,332 | 3/1969 | Marzocchi et al. | 117/62 |
| 3,591,357 | 6/1971 | Janetos et al. | 65/3.44 X |
| 3,616,185 | 10/1971 | Goldberg | 427/407.3 |
| 3,620,701 | 11/1971 | Janetos et al. | 65/3.44 |
| 3,627,714 | 12/1971 | Merkl | 117/139.5 |
| 3,653,957 | 4/1972 | Schafer et al. | 428/394 |
| 3,740,263 | 6/1973 | Kochlar et al. | 428/378 |
| 3,814,592 | 6/1974 | McWilliams et al. | 65/3 |
| 3,837,892 | 9/1974 | Marzocchi | 117/62.1 |
| 3,862,882 | 1/1975 | Marzocchi | 428/378 |
| 3,869,308 | 3/1975 | Graham | 117/126 |
| 3,875,118 | 4/1975 | Meisert et al. | 260/75 |
| 3,924,028 | 12/1975 | Benson et al. | 117/7 |
| 4,031,288 | 6/1977 | Bhakuni et al. | 428/394 |
| 4,034,138 | 7/1977 | Babayan | 428/378 |
| 4,147,555 | 4/1979 | Cohen et al. | 428/378 |
| 4,178,412 | 12/1979 | Sage et al. | 428/391 |
| 4,264,655 | 4/1981 | Brook | 427/389.8 |
| 4,271,229 | 6/1981 | Temple | 428/288 |
| 4,272,294 | 6/1981 | Jaunarajs | 106/99 |
| 4,276,044 | 6/1981 | Dieterich | 8/115.5 |
| 4,295,871 | 10/1981 | Droux et al. | 65/3.41 |
| 4,390,647 | 6/1983 | Girgis | 65/3.41 X |
| 4,405,746 | 9/1983 | Girgis | 523/206 |
| 4,450,197 | 5/1984 | Hager et al. | 428/392 |
| 4,663,231 | 5/1987 | Girgis et al. | 428/378 |

FLEXIBLE, CHEMICALLY TREATED BUNDLES OF FIBERS AND PROCESS

This application is a continuation of application Ser. No. 865,597, filed May 22, 1986 now abandoned which application is a continuation of application Ser. No. 635,952, filed July 30, 1984 now abandoned.

The present invention is directed to chemically treated bundles of fibers such as strands and yarns, which can be fabricated into myriad products including braided fabrics and fabrics which can be coated or laminated with polymeric films.

Glass fibers, which were originally developed in the 1930's, have been applied over the years as fibers, strands and yarns in numerous end uses such as textiles and reinforcement for polymeric matrices and rubber goods. Glass fibers are traditionally produced through attenuation from small orifices in a bushing of a glass batch melting furnace. The glass fibers issue forth from the orifices in molten streams and are cooled and treated with a sizing composition. The sizing composition is ordinarily an aqueous composition having components like coupling agents, lubricants and film forming polymers. The sized glass fibers are gathered into one or more bundles of fibers or strands and wound into a forming package or chopped. For textile applications, the bundles of fibers in the forming packages can be twisted or false twisted or combined with other strands and twisted or false twisted to form yarns. In producing fabrics from the yarns, the yarns which will constitute the fill yarns are usually further treated with a slashing sizing composition so that they can undergo the rigors of weaving. Fabrics having the warp and weft yarns usually are heat-cleaned to remove both the forming and slashing sizing compositions. When the glass fiber strands from the forming packages are used for reinforcement of rubber goods, a second chemical treatment or coating is usually applied to the strands to make the strands or bundles of strands or cords compatible with the rubber matrix. This second coating is known in the industry as an RFL dip coating, where the term "RFL" means resorcinol formaldehyde latex coating and where the latex material includes a diene-containing elastomer to participate in the vulcanization of the rubber matrix.

Some of the outstanding properties of glass fibers that have fostered their growth in these numerous commercial applications include: relative nonflammability, heat and chemical resistances, excellent tensile and excellent dimensional stability. These advantageous characteristics of glass fibers have not been fully utilized in numerous textile fabrics because other fibers such as polyesters and nylons have much better flex fatigue characteristics than the glass fibers. Many textile fabrics could utilize the advantageous characteristics of glass fibers, if the glass fibers were more flexible and had a better flex fatigue characteristic like polyester and nylon textiles. A few examples include woven or knitted fabrics and nonwoven scrim and chemically coated textile fabrics useful in wall coverings, carpet backings, filter fabrics, tarpaulins, pond liners or pond covers, awnings, sail cloth, electrical sleevings and harnesses and the like.

For instance, textile fabrics of polyesters and polyamides such as nylon, aramide fibers like Kevlar ® fibers, rayon and other organic and even some inorganic man made fibers like griege glass fiber fabric, have been coated with polymers such as polyvinyl chloride, polyurethanes, silicones, polytetrafluoroethylene, neoprene and synthetic rubbers, to produce coated fabrics. These have found wide application in the industrial and commercial, architectural and building industries and for sundry geotextile applications. The performance requirements of the textile fabric in the polymeric coated textile fabric include: high tensile strength, good flexibility, good weatherability, good chemical resistance, good flexibility in various climates, high tear strength and resistance to tear propagation, good dimensional stability to minimize stretch underload, good stability under various temperature and humidity conditions, good abrasion and good adhesion to the polymeric film coating. These performance requirements are applicable to coated fabrics used in large applications such as air and tension structures like air supported covers over athletic stadiums and airport facilities to smaller applications such as awnings and tarpaulins. For instance, in the air and/or tension structures, the air supported covers can be huge, ranging from 26,000 square meters for an athletic stadium to 425,000 square meters for an airport facility. Two desirable properties in this application and the other applications are good flame resistance and dimensional stability. These are two of the excellent properties of glass fibers but the lack of the requisite flexibility, abrasion resistance and adhesion to the polymeric film coating have limited the use of glass fibers in coated textile fabrics.

It is an object of the present invention to provide coated bundles of fibers having a high modulus and low elongation with improved flexibility and abrasion resistance to result in improved woven and nonwoven fabrics, which can be manufactured into numerous woven and nonwoven fabrics taking advantage of the nonflammability and dimensional stability provided by the fibers.

It is an additional object of the invention to provide bundles of fibers having a high modulus and low elongation with good flexibility and flexural fatigue properties, where the fabrics prepared from the bundles need not be heat cleaned to remove various chemical sizing compositions applied to the fibers.

SUMMARY OF THE INVENTION

Accordingly, the aforementioned objects and other objects gleaned from the following disclosure are accomplished by the bundles of fibers impregnated with the moisture reduced, partially cured residue of an aqueous chemical treating composition. The fibers can be any fiber having modulus of elongation of at least $7 \times 10^6$ psi and an elongation at break of less than 5% and where the fibers are sensitive to interfilament abrasion. The bundles of fibers have a plurality of fibers, where each fiber has a first chemical treatment and the bundle of fibers has a second chemical treatment impregnating the bundle. The first chemical treatment is present on a substantial portion of the surfaces of the fibers as a moisture-reduced residue of an aqueous chemical treating composition. The aqueous chemical treating composition, referred to as a sizing composition, has at least a fiber protectorant such as a film forming polymer and/or lubricant, and, if the hydrophilic character of the fibers would limit compatibility with polymers, a hydrophilicity reducing agent such as a coupling agent can be present. The type of protectorant and the absence of interfering components enables the fibers in the form of a bundle to separate one from another when confronted with a disturbing force. The disturbing force can be mechanical contact, gaseous contact, hydrodynamic force or any other frictional contact to disturb the fibers one from the other to allow for fiber separation. The amount of the moisture reduced residue of the sizing composition that is present is in the range of about 0.05 to about 5 weight percent of the treated fiber. The one or more bundles of gathered sized fibers have the moisture-reduced, partially cured impregnating coating resulting from an aqueous impregnating composition having one or more water soluble, dispersible or emulsifiable, non-diene and non-chlorine-containing elastomers, one or more crosslinking materials, and water. The impregnating coating is curable to the extent of about 10 weight percent or less, and the crosslinking material is present in the impregnating composition in an amount that is effective to engender at least a partial cure of the impregnating coating. The crosslinkable material can effect such a cure through selfcrosslinking, crosslinking with the elastomeric polymer or a mixture thereof. Furthermore, the aqueous impregnating composition has an effective viscosity for impregnating the bundles of fibers and the amount of moisture-reduced impregnant on the bundles is greater than around 5 weight percent of the bundle with the exact amount depending on the filament diameter of the fibers in the bundle. The water in the impregnating coating composition is present in a predominant amount so that the total solids and viscosity of the impregnating coating composition are effective for impregnating the bundle of fibers. The impregnation is to such degree to result in the moisture reduced, partially-cured residue of the aqueous impregnating composition being present as a coating on a substantial portion of a majority of the filaments in the bundle so that a majority of the filaments are separated to some extent from each other by the moisture reduced, partially cured coating.

Optionally, included in the aqueous impregnating composition for the fibers are the following water soluble, dispersible or emulsifiable materials: fiber lubricants, silane coupling agents, diene-containing elastomers, plasticizers, waxes, pigments, dyes, fire retardants and the like. The use of the lubricant is especially useful when the impregnated bundle of fibers is to be braided or woven, and not coated as a fabric with a polymeric coating.

The fibers can be produced by methods well known to those skilled in the art. For example, glass fibers are produced from small orifices in a bushing of a glass batch melting furnace from any fiberizable glass composition, where the filaments are properly treated with an aqueous sizing composition. The aqueous sizing composition is applied to protect the filaments from interfilament abrasion and damage, and, if necessary, render the surface of the glass fibers less hydrophilic to be more compatible with hydrophobic coatings. A plurality of sized glass fibers are gathered into one or more bundles, strands, and collected into a package. One or more bundles of sized glass fibers are removed from one or more packages and treated with the aqueous impregnating composition in such a manner that the sized glass fibers within the bundle separate one from another to a degree to allow the impregnation of the bundle by the aqueous coating composition with the effective viscosity and total solids. The impregnated bundle of glass fibers is dried to partially cure the impregnant to produce impregnated bundles of glass fibers having sufficient flexibility for production of fabrics. The fabric subsequently can be coated to produce coated fabrics by processes such as impregnation or saturation and other surface coating processes like solvent-containing coatings, plastisols and lamination with preformed films or sheets of coating polymeric materials. When the aqueous impregnating composition has a lubricant to provide the bundles of glass fibers with an effective amount of lubricity, the impregnated bundles of glass fibers can be braided into various fabrics.

DETAILED DESCRIPTION OF THE INVENTION

Figure 1:
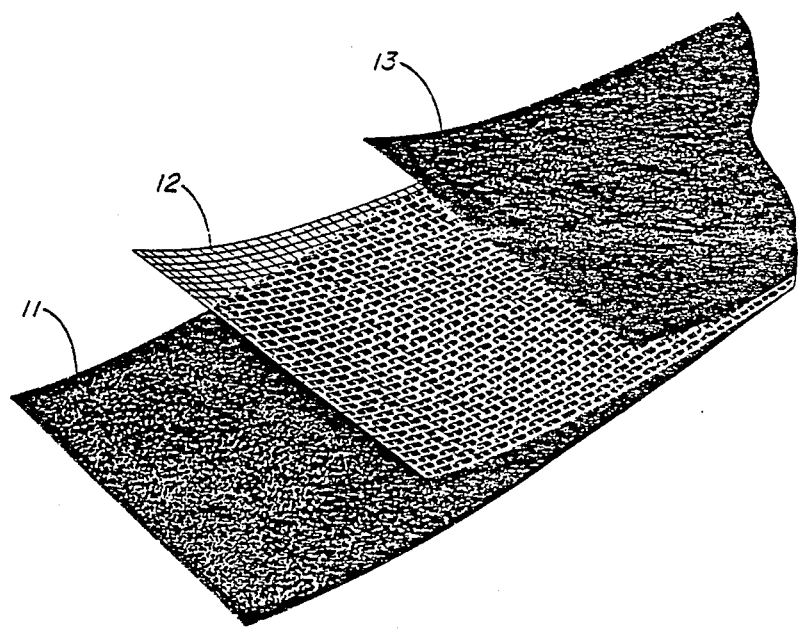
FIG. 1 depicts the coated fabric showing the laminated sheets or films used in conjunction with the fabric of impregnated bundles of fibers.

When the high modulus, low elongation fibers are glass fibers, they can be produced from any fiberizable glass batch composition and prepared into glass fibers such as "E-glass fibers", "621-glass fibers", "A-glass fibers", "S-glass fibers", "C-glass fibers", and low fluorine and/or boron derivatives thereof. The glass fibers issue forth from orifices in a bushing of the glass batch melting furnace and, when they have cooled sufficiently, the aqueous sizing composition is applied to them. The glass fibers can be mechanically attenuated or prepared by any other method known to those skilled in the art. The aqueous sizing composition can be applied to the glass fibers by any method known to those skilled in the art such as belts, rollers, sprays, and the like. The aqueous sizing composition has present a hydrophilic reducing agent such as a coupling agent to make the fibers less hydrophilic and a protectorant, where the protectorant can be a glass fiber lubricant or a glass fiber film forming polymer. The film forming polymer forms a film upon the evaporation of a carrier, or upon drying or actually forms a liquid film. Also for glass fibers and other types of fibers, additional ingredients like friction-reducing agents and/or antistatic agents may be present. Any coupling agent, glass fiber lubricant or glass fiber film forming polymer known to those skilled in the art can be used. It is preferred that the sized glass fibers do not have present or are essentially free of a starch film forming material or any other material that would provide too much cohesion between the fibers. A nonexclusive example of a suitable nonstarch containing aqueous sizing composition for glass fibers is that disclosed in U.S. Pat. No. 4,390,647 (Girgis), which is hereby incorporated by reference. The sized glass fibers are gathered into bundles or strands of glass fibers, where the bundles can comprise from 200 to over 3,000 filaments. The bundles of fibers or strands are collected usually by winding onto a forming package or into a precision wound package of roving.

The sized glass fibers usually have about 0.05 to about 5 weight percent of the sized glass fiber strands as the sizing composition, which has reduced moisture by the evaporation of water either by air drying or by drying at elevated temperatures. Although the sized glass fibers can also be in a wet condition when treated with the aqueous impregnating composition.

In the aqueous sizing composition applied to the glass fibers, the coupling agents employed can be any coupling agent known to those skilled in the art such as silane coupling agents, a few examples of which are gamma aminopropyltrimethoxy silane, methacryloxypropyltrimethoxy silane, glycidoxypropyltrimethoxy silane, and the like, and metal halide complex coupling agents like methacrylato chromic chloride complex. Such agents are described in U.S. Pat. No. 2,611,718. Other Werner type coupling agents having vinyl, alkyl, amino, epoxy, mercaptyl, thioalkyl, thioaryl, and phenyl groups are also suitable for incorporation into the size of the instant invention. Nonexclusive examples of the various silane coupling agents that can be used in the sizing composition of the instant invention include in general hydrolyzable vinyl, alkyl, betachloropropyl, phenyl, thio-alkyl, thio alkyl aryl, amino-alkyl, methacrylato, epoxy and mercapto silanes, their hydrolysis products, polymers of the hydrolysis products and mixtures of any of these may be employed. The usual amounts of coupling agents employed in sizing compositions for glass fibers can be used such as an amount of 0.1 to 2 percent by weight based on the aqueous sizing composition can be used.

The fiber protectorants that can be used in the sizing composition of the present invention include any glass fiber lubricant including wet lubricants and nonionic lubricants or dry lubricants such as cationic lubricants like Cation-X, which is an alkyl imidazoline derivative produced as a reaction product of stearic acid and tetraethylene pentamine stearic acid. Also acid solubilized water, soluble, dispersible stearic amides and anhydrides, acid solubilized water dispersible low molecule weight fatty acid amides, as well as anhydrous acid solubilized and polyunsaturated lower molecular weight fatty acid amides can also be used as the cationic lubricants. Typical hydrogenated vegetable oil lubricants can also be used such as hydrogenated cotton seed oil, hydrogenated corn oil, hydrogenated soy bean oil and the like. An example of the film forming polymeric materials that can be used include the polyoxyalkylene polyols or polyalkylene polyols; gelatin; glucose, cellulosic materials such as carboxymethyl cellulose, hydroxyethyl cellulose, methyl cellulose; oxyethylated stearates; and synthetic resins, such as ureaformaldehyde polymers, melamine-formaldehyde polymers, acetoneformaldehyde polymers, phenol-formaldehyde polymers; alkyd resins such as glyceryl-phthalic anhydride reaction products; polyamides, saturated and unsaturated polyesters, hydrocarbon-siloxane resins, epoxy resins; vinyl resins such as homopolymers and copolymers of ethylene, propylene, styrene, isobutylene, butadiene, acrylonitrile, vinyl chloride, vinyl pyrrolidone, vinylidene chloride, vinyl acetate, vinyl alcohol, acrylic acid and ester thereof, methacrylic acid and esters thereof, and the like. Mixtures of these film formers may also be employed. These film-formers are preferably used in the form of aqueous solutions, dispersions or emulsions. Also known silylated versions of the aforementioned film formers can also be used.

The essentially predominant constituent of the solids of the aqueous impregnating coating composition is the aqueous soluble, dispersible or emulsifiable elastomeric polymer that is essentially free of any hydrocarbon diene functionality and essentially free of any chlorine functionality. The meaning of essentially predominant constituent means that most of the solids is comprised of the elastomeric polymer, but the amount can be less than a majority of the solids, such as around 40 weight percent or more. Usually, when the amount is less than around 50 weight percent of the solids, there are more components present. Hence, the total amount of the elastomeric polymer is reduced, but it is still present in an amount of the solids that is greater than any other single component.

The term "elastomer" includes a substance capable of being extended to twice its own length at 68° C. and on release of the stress returns with force to approximately its original length all within a reasonable period of time. These materials are noncrystalline in the undeformed state and they have a sufficiently high enough molecular weight to make them elastomeric materials. Also these materials have glass transition temperatures (Tg) of around 0° C. or less. The Tg can be determined by any method known to those skilled in the art; for example, nuclear magnetic resonance peak ratio or by less complicated methods involving more approximation like differential thermal analysis. The elastomeric materials can have limited branching, aromatic content and/or polar functionality as long as the Tg of the material is less than around 0° C.

A type of elastomeric polymer that is water soluble, dispersible or emulsifiable that can be employed are the elastomeric, ethylene-containing interpolymers. The interpolymer, which is usually a copolymer or terpolymer, is formed from ethylene monomer and one or more polar comonomers, where the comonomer may vary from co-crystallizing with the polyethylene crystal structure or resulting in an essentially noncrystalline (amorphous) interpolymer. Nonexclusive examples of these polar comonomers include: vinyl acetate, methyl acrylic acid, ethyl acrylic acid, styrene, alpha methyl styrene, methyl methacrylic acid, acrylamide, methyacrylic acid, n-methyl-n-vinyl acetamide, diethyl fumarate, diethyl maleate, n-vinyl pyrrolidone, n-vinyl succinimide and the like and mixtures thereof. The interpolymer has a ratio of the ethylene to the polar comonomers sufficient to have a glass transition temperature (Tg) of around 0° C. or less. The interpolymers should be uniform interpolymers rather than nonuniform or alternating copolymers or terpolymers although the latter two types may be used to a limited extent. The uniform interpolymers are those that are formed either from two or more monomers having equal reactivities polymerized to any conversion percent or by limiting the percent conversion during interpolymerization to a low percent conversions when the monomers have different reactivities so that the comonomer concentration is kept almost constant. The nonuniform copolymers and alternating copolymers are those known to those skilled in the art. The interpolymers are also water soluble, emulsifiable or dispersible with the use of suitable emulsifiers and/or solvents. The interpolymers can be produced by any method known to those skilled in the ethylene copolymer art. A particularly useful elastomeric ethylene-containing interpolymer is an ethylene vinyl acetate copolymer having the vinyl acetate monomer present in the copolymer as the polar comonomer in an amount in a range of around 25 mole percent or greater or about 45 to about 80 weight percent of the copolymer. A nonexclusive example of such an ethylene vinyl acetate copolymer is that commercially available from Air Products and Chemicals, Inc. in an emulsion form under the trade designation Airflex ® 410 vinyl acetate/ethylene copolymer emulsion. This material has the copolymer formula of $A_x$-$B_y$ where A is equal to $C_4H_6O_2$ and B is equal to $C_2H_4$. The appearance of the emulsion is a white mobile liquid having a viscosity of 100 to 2,000 as measured by Brookfield viscosimeter, Model LVF (No.

2 or No. 3 spindle at 60 rpm and at 77° F). Also the emulsion has a pH of 4 to 7 and a percent volatiles by volume of 45 to 53 and a specific gravity of 1.1 and a density of 9 pounds per gallon. The dispersion has very small polymer particles in water and contains formaldehyde at concentrations of up to 0.1 percent by weight with no other photochemically-reactive solvents or reactive chemical solvents added. The residual unpolymerized monomer levels are less than 0.5 percent of the total product. The amount of the ethylene-containing interpolymer present in the aqueous coating composition is an effective film forming amount for impregnating the bundle of filaments to produce a near continuous film on a substantial portion of the surfaces of the filaments in the bundle of filaments. Also the amount may be effective to form a film on the bundle of filaments. Generally, the amount is a predominant amount of the solids of the aqueous coating composition.

Another type of elastomeric polymer that is water soluble, dispersible or emulsifiable that can be employed in an aqueous impregnating coating is the elastomeric polyurethanes. By the use of the term polyurethane, it is meant to include reaction products of organic compounds having at least two active hydrogens and di and/or polyisocyanates, wherein the resulting polymer is an elastomeric curable polyurethane or polyurethane urea type polymer. By elastomeric, it is meant that the film of the polyurethane alone has a hardness of about 10 shore A to about 75 to 80 shore D with a preferred hardness of shore A 60 to 100 and elongation on the order of 100 to 800 percent. The Shore hardness test is conducted on a Shore durometer by standard procedures, and elongation is measured in accordance with ASTM testing procedure, D412. Preferably, the organic compounds with at least two active hydrogens is a polyol such as a polyester polyol or polyether polyol and most preferably, a polyol which is linear. Examples of polyester-based polyurethane elastomers include those where the polyester is prepared from carboxylic acid such as adipic and the glycol portion can be selected from such materials as ethylene glycol, 1,2-propylene glycol, 1,3-butylene glycol and 1,4-butylene glycol. Further examples of polyfunctional polyesters which can be used are those based on phthalic anhydride, adipic acid, ethylene glycol, trimethylol propane, and the like. A slight amount of branching of the polyol can be tolerated but the degree of functionality or branching of the polyol should be kept to a minimum since increased branching results in films that are tougher, harder and less flexible. The di or polyisocyanates generally used to form the polyurethane are selected from aromatic, aliphatic and mixtures thereof, isocyanates, but the aliphatic isocyanates are preferred. Examples of the polyisocyanates that can be used include the aromatic isocyanate of toluene diisocyanate and the aliphatic isocyanates such as hexamethylene diisocyanate, methylcyclohexylene diisocyanate, dicyclohexyl methane diisocyanate, lysine diisocyanate where the aliphatic group is methyl or ethyl, bis(2-isocyanato ethyl) furmarate, bis(2-isocyanato ethyl) carbonate and dimeryl diisocyanate, where the organic group is essentially a $C_{36}$ hydrocarbon radical. Another isocyanate that may be used is 4,4'-diphenyl methane diisocyanate. The polyurethane polymer can be made as a curable material by any method known to those skilled in the art, for instance, additional monomers like diisocyanate, polyols or epoxies can be added to the polymer and/or a curable moiety can be introduced into the polymer. Nonexclusive examples of the aforementioned reactive groups or moieties used to make the curable polyurethane elastomer are hydroxyls, epoxies, ureas, amines, amides, and olefinic groups, or reactive methylene or olefinic groups. The polyurethane polymers can be produced by any one-shot or single step method known to those skilled in the art or by the two step chain extension process utilizing linear or lightly branched polyols with the necessary molar portions of the diisocyanate known to those skilled in the art to produce a water dispersible polyurethane. One or more or a mixture of these various elastomeric curable polyurethanes can be used in the aqueous coating composition of the present invention. Particularly, two or more of the polyurethanes can be blended to achieve a desired hardness and/or elongation property for the coating on the sized glass fibers. These elastomeric curable polyurethanes are water soluble, emulsifiable or dispersible through the use of dispersing agents and emulsifiers which can have a nonionic, cationic, and/or anionic and/or amphoteric or zwitterionic nature. In addition, the polyurethane polymers can be internally emulsified by incorporating one or more dispersing agents or emulsifiers with the other polyurethane producing monomers to produce the polyurethane polymer. The curable polyurethane has a maximum curability through crosslinking of a maximum of around 10 percent or less based on the solids of residue of the aqueous impregnating composition or on a dry basis.

Nonexclusive examples of the polyurethane polymers that can be used as the film forming polymers in the impregnating coating include those that are internally emulsified, examples of which are shown in U.S. Pat. Nos. 4,143,091; 4,208,494; and 4,208,495, all of which are hereby incorporated by reference. Other types of polyurethane polymers that can be used are those having ionic groups present on the polymer molecule such as those disclosed in U.S. Pat. No. 4,066,591, which is hereby incorporated by reference. Other types of polyurethane ionomers, e.g. polyurethane polymers having ionic groups present on the polymer, that can be used in the composition of the present invention include polyurethane ionomers such as anionomers and cationomers. Nonexclusive examples of the ionomers include anionomers that are produced by reacting organic diisocyanates having molecular weights of from about 160 to about 300 with tri and/or tetra alkylene polyol such as ethylene glycol, and optionally other aliphatic glycols having molecular weights of from about 62 to about 200 in the presence of glycols containing carboxyl, carboxylate, sulfonic acid and/or sulfonate groups and having a molecular weight of less than around 500. These polyurethane polymers containing the ionic groups or hydrophilic polyether segments are self-emulsifiable and do not need emulsifiers or high shear forces to be emulsified or dispersed, since they are self-dispersing. Also cationic polyurethanes that are formed by quaternizing polyaddition reactions can be used. Combinations of the ionic polyurethanes with polyesters, polyethers, polyacetals, polyisocyanates, low molecular weight glycols and diamines can also be used. The type and amount of the ionic groups present in the ionic polyurethanes are selected so that the polyurethane is not only self-dispersing but that the particle size of the polyurethane is less than around 5 microns. The properties of these polyurethane polymers can vary from hard film properties to flexible film properties. It is those polymers with the flexible film properties that are most useful in the present invention.

Specific examples of commercially available polyurethane polymers that can be used include the aliphatic polyurethane dispersions such as Witcobond W-212 and W-234, available from Witco Chemical Corporation. The Witcobond W-212 material has a milky white appearance with a 30 percent solids level and a density of 8.7 lb/gal. The flash point is greater than 100° C., and the particle charge is cationic and the particle size is 1μm. The pH at 25° C. (77° F.) is 4.5, and the viscosity at 25° C. (77° F.) in Brookfield LVF (cps) is 50, and the surface tension in dynes/cm is 41. Another polyurethane used in the present invention is the Witcobond W-234 polyurethane available from Witco Chemical Corporation. The W-234 polyurethane is hazy in appearance and aliphatic in chemical type. The solids is 30 percent, and the density is 8.8 lb/gal. The flash point is similar to the W-212 material, and the particle charge is anionic, while the dispersion is colloidal. The pH at 25° C. (77° F.) is 8.0, and the viscosity at 25° C. (77° F.) as measured by Brookfield LVF in cps is 100, and the surface tension in dynes/cm is 54. The preferred polyurethane is the Witcobond W-290H material, which is milky white in appearance, aliphatic in type with a 65 percent solids level and with a particle size of around L5,μm and a pH at 25° C. (77° F.) of 7.5 and a viscosity as measured by Brookfield LVF in cps of 200 and a surface tension of 42 dynes/cm. The film properties of the 290H material are 4500 psi tensile strength, 720 percent elongation and moduli of 250 psi at 100%, 540 psi at 300% and 1550 psi at 500%.

Additional types of aqueous soluble, dispersible or emulsifiable elastomeric polymers that can be employed in the aqueous impregnating coating composition include: elastomeric silicones such as elastomers formed from polydiorganosiloxanes with hydroxyl and/or alkoxy functionality with the use of internal or external emulsifiers, for instance, an alkylene oxide type internal emulsifier. Also silicones formed from 3,3,3-trifluoropropylmethylsiloxane can be employed. Further examples of elastomers include fluororubbers such as copolymers of vinylidene fluoride and perfluoro propylene, polysulfide polymers, ethylene propylene rubber and polyethers.

In addition to the elastomeric polymer, a crosslinking material is present in the aqueous impregnating coating. The crosslinking material can be selfcrosslinkable and/or crosslinkable with the elastomeric polymer. The crosslinking material is present in an effective amount to provide a degree of crosslinking to reduce any tackiness of the elastomeric polymer in the moisture reduced impregnant residue or to render the elastomeric polymer water insoluble in the moisture reduced, at least partially cured residue of the aqueous impregnating composition. Also when the bundle of filaments is to be coated further as a woven or nonwoven fabric with a film coating of a polymeric matrix, the crosslinking material can provide sufficient crosslinkability for good adhesion or cohesion with the matrix polymer. If the elastomeric polymer can crosslink directly with the polymeric matrix, this amount of crosslinking material would not be necessary. The amount of the crosslinking material present in the aqueous coating composition is that amount to provide effective crosslinking of the moisture reduced residue of the elastomeric polymer to provide a film that has a hardness in the range of Shore values from A 10 to about D 80 and preferably from about A 60 to about SA 100 and elongation of about 100 to about 800 percent and most preferably, a modulus at 500 percent elongation of around 500 to about 4,000 psi. Around 10 weight percent and most preferably, up to 6 weight percent on a dry basis of the impregnating coating with the elastomeric polymer is crosslinkable, that is, curable, so that the amount of the crosslinking material is sufficient to crosslink with itself or with the elastomeric polymer almost up to that degree of crosslinking. For example, when the ethylene vinyl acetate is the elastomeric polymer and the crosslinking material is a selfcrosslinking material, the partial curing controls the surface tack of the moisture-reduced residue of the impregnant to enable a nearly uniform payout of the impregnated bundle of filaments from wound packages, where the bundle of filaments is comprised of larger diameter filaments, the partial curing by crosslinking can be reduced. Where the bundle of filaments has the finer diameter filaments, the partial curing can be increased from that for larger diameter filaments. Where the impregnated bundles of filaments are packed more densely on a wound package, the bundles will be more tack sensitive and a higher degree of partial curing through crosslinking is desirable. With such a controlled surface tack characteristic, the bundle of filaments impregnated with the aqueous coating composition in a moisture-reduced state can be processed on weaving looms without the use of loom feeders. Although if loom feeders are available, the partial curing can be reduced so that surface tackiness is not controlled as stringently. Preferably, the partial curing results in a hardness or modulus of the moisture-reduced residue of the aqueous coating composition impregnating the bundle of filaments so that the flexibility of the impregnated bundles of filaments has at least a two-fold improvement in flexibility. The improved flexibility is over a similarly constructed, unimpregnated bundle of filaments.

Suitable crosslinking materials include nonpolymeric compounds, monomeric and oligomeric materials and polymeric materials. All of these materials are at least selfcrosslinkable at ambient or elevated temperatures and at atmospheric or sub- or super-atmospheric pressures. By selfcrosslinkable, it is meant that the material need not crosslink with the elastomeric polymer. The polymeric material may be selfcrosslinkable through external chemical compounds or through internal crosslinking. By external crosslinkable, it is meant that crosslinking agents known by those skilled in the art for particular resinous polymers can be used to crosslink the polymer. Resinous polymers include such polymers as epoxies, methylol condensate polymers, polyurethanes, polyesters and other polymers that are not rubber polymers as are butadiene, isobutylene, styrene-butadiene-vinyl-pyridine terpolymers and styrene-butadiene copolymers and the like.

A few nonexclusive examples of selfcrosslinkable materials include: aldehyde condensates used in conjunction with acid or basic catalysts, such as melamine formaldehyde, hexakis (methoxymethyl) malemine, phenol formaldehyde and resorcinol formaldehyde include both methylol-containing condensates, monomers, dimers, trimers and higher oligomers. The phenol or resoricnol compounds include cresol and mixtures ot its isomers, xyloneol or mixtures of its isomers, a mixture of homologs of phenol and dihydric phenols such as phlorglucinol, cresorcinol, and meta-xylorcinol. The aldehyde includes any methylene donor that can be used for the formaldehyde such as paraformaldehyde, hexamethylene-tetramine acid aldehyde and furfural and mixtures thereof. The crosslinking materials can be an external and/or internal crosslinking or curing agent that are relatively unreactive at room temperature and are reactive for crosslinking at elevated temperatures. Nonexclusive examples of suitable crosslinking materials for polyurethanes include compounds like hexakis (methoxymethyl) melamine, lower hydrocarbon epoxides like that containing 2 to 12 carbon atoms including styrene oxide, alpha phenyl propylene oxide, trimethylene oxide, lower alkylene oxides like epoxides containing from 2 to 8 carbon atoms including ethylene oxide, propylene oxide, butylene oxide, isobutylene oxide and the like, and formaldehyde and alkoxysilanes and phenolics. Nonexclusive examples of monomeric crosslinking materials for polyurethanes are those monomers which are reactive with polyurethane like diisocyanate and polyisocynates and organic compounds with at least two active hydrogens. Nonexclusive polymeric materials include methylol-containing condensates of phenolic compounds, polyhydroxyphenolic compounds like resorcinol, urea, melamine, and the like, where the methylol results from any methylene donating compound like formaldehyde in its various forms like paraformaldehyde, hexamethylene-tetramine, acid aldehyde and furfural and mixtures thereof, and also includes aminoplastic resins, organic polyisocyanates, and epoxy-containing polymers. Further examples of suitable external and internal crosslinking materials are given in U.S. Pat. No. 4,066,591 (Scriven et al.), assigned to the common assignee of this application and this patent is hereby incorporated herein by reference. It is preferred to have one or more melamine formaldehyde resins because of their ease in crosslinking and their compatibility with the polyurethane polymers.

A particularly suitable melamine formaldehyde resin is the aqueous melamine formaldehyde resin avaiable from Monsanto Company under the trade designation Resimene 841 which has less than 2 percent free formaldehyde and less than 5 percent methanol and has a boiling point of 210° F. The Resimene 841 also has a vapor pressure of 95 for methanol and 17.5 for water, a vapor density of 1.11 for methanol and .64 for water and has a colorless, clear mobile liquid appearance and has a specific gravity at 77° F. of 1.25 and a percent volatile by volume percent of 29. Such a crosslinkable material as the melamine formaldehyde resin may require the use of a crosslinking controlling agent to control the degree of crosslinking between the crosslinkable polymer material and possibly between the crosslinkable material and the polyurethane polymer. The crosslinking controlling agent can be one which modifies the pH of the coating composition such as ammonium hydroxide or an acid catalyst for the crosslinkable material. A nonexclusive example of the latter is a solution of toluene sulfonic acid in isopropanol such as that available under the trade designation Cycat 4040 with 40 percent acid and 60 percent alcohol available from American Cyanamide Co. Another particularly suitable material is that available from Witco Chemical Corporation under the trade designation Witcobond® XW aqueous epoxy emulsion. This epoxy emulsion has an epoxide equivalent weight of 345 to 385, a percent nonvolatiles of 54 to 56 percent, a viscosity in Brookfield at 25° C. (77° F.), poise of 15 to 70 and an appearance which is a milky white liquid, and has a flashpoint of greater than 200° F. (93° C.), has pounds per gallons at 25° C. of 9.1.

When the elastomeric polymer is a silicone, the crosslinking material can be an acetoxy, ketoxime or alkoxy functional compound or other curing agents for silicone known to those skilled in the art.

The water in the aqueous chemical treating composition constitutes a predominant amount of the composition including both volatile and nonvolatile portions. The amount of water results in a total solids concentration and viscosity for the composition that enables the composition to impregnate the bundle of filaments including bundles of strands and yarn. The degree of impregnation of the bundle of filaments is such that a majority of the filaments have a substantial portion of their surfaces covered with a near continuous film of the residue of the aqueous coating composition so that a majority of the filaments are separated from each other. It is not necessary that the bundle is encapsulated, although it may be as long as it is also impregnated. Preferably, when the polyurethane polymer is preemulsified or dispersed for addition to the aqueous coating composition to a solids content of around 50 percent or less, the viscosity of the aqueous coating composition is around 5 or less for a kiss roll type coating application and up to around 15 ±5 centipoise at room temperature for a die coating process. The total solids of the aqueous coating composition varies depending upon the diameter of the filaments in the bundle. The variation is that the finer diameter filaments require a higher total solids in the aqueous chemical treating composition, since the surface area of the finer diameter filaments is higher.

In addition to the aqueous dispersible, emulsifiable or soluble elastomeric polymer and crosslinking material present in the aqueous coating composition along with water, there may also be present a number of optional components. The type of optional component present depends upon the final end use of the coated bundle of fibers. For instance, where the coated bundle is to be braided and woven for producing electrical harnesses to contain electrical wires, a lubricant should be present in the aqueous coating composition. Any glass fiber lubricant known to those skilled in the art can be incorporated into the aqueous coating composition. A particularly suitable lubricant is a silylated lubricant available from Union Carbide Corporation under the trade designation Y-9662. This material as described in the Product Safety Data Sheet is an organosilane ester with a boiling point of greater than 150° C. at 760 mm Hg and with a specific gravity of 1.05 at 25/25° C., and with a vapor density of greater than one, and with a vapor pressure at 20° C. of less than 1 mm Hg and with less than 1 percent volatiles by volume, and with an evaporation rate of less than 1 with butyl acetate equal to one and with an appearance of a clear to slightly hazy colored liquid and with a characteristic odor.

Another additional ingredient that can be present in the aqueous coating composition is one or more silane coupling agents and any of the aforelisted silane coupling agents used in the aqueous sizing composition can be used in the aqueous coating composition.

Also, one or more aqueous dispersible, emulsifiable or soluble plasticizers can be included in the aqueous coating composition. The aqueous dispersible or emulsifiable plasticizers would be used with suitable nonionic, cationic, anionic, amphoteric or zwitterionic emulsifiers or dispersing agents having HLB values which are in the same range as the HLB value of the plasticizer. When one or more plasticizers are used in the aqueous coating composition, the type of polyurethane polymer that can be used can have higher hardness values since the plasticizers reduce the hardness value of the film of the coating composition on the bundle of filaments. Suitable examples of plasticizers that can be used include butyl benzyl phthalate available under the trade designation Sanitizer 160, wherein a suitable emulsifier is polyoxyethylene sorbitan monolaurate available from ICI America, Inc. under the trade designation Tween ® 21 emulsifier. Another example of a suitable plasticizer is tri-xylyl phosphate available under the trade designation Phosflex 179 ®-A available from Stauffer Chemical Company. This material is a liquid with a specific gravity at 20-° C./20-° C. of 1.143, a density of pounds per gallon of 9.5, a boiling point in degrees C. at 10 millimeters of mercury of 265-285° C., a pour point of 0° F., a viscosity at 100° F. SUS of 220 and a flashpoint of 455° F.

Another suitable plasticizer is Benzoflex dibenzoate esters of dipropylene glycol or any of several polyethylene glycols available from Velsicol Chemical Corporation. Another optional component that may be present in the coating composition is a flame retardant, where any flame retardant that is water soluble, emulsifiable or dispersible can be used. A suitable flame retardant is antimony trioxide which can be emulsified with the Tween 21 emulsifier in water.

In addition, an optional component of the aqueous chemical coating composition can be one or more aqueous emulsifiable or dispersible waxes. The type and amount of wax is that which is effective to serve as an adhesion promoter for the matrix coating that will be applied to fabrics made from the flexible bundle of filaments. In addition, the type and amount of wax can be effective to provide a screen effect against ultraviolet degradation when the fabric or polymer coated fabric is not protected from the weather or the envionrment. Also the wax may modify the frictional properties of the impregnated bundles of filaments. The one or more waxes can be dispersed or emulsified in water with any suitable emulsifiers known to those skilled in the art. The one or more waxes can be included in the aqueous coating composition in a preemulsified or predispersed form. The preferred wax materials are the microcrystalline wax materials and suitable examples of commercially available predispersed forms include Polymekon SPPW-40 microcrystalline wax available from Petrolite Corporation-Bareco Division, Tulsa, Oklahoma. This material is a hydrocarbon water dispersion with a 40 percent solids. Another suitable example of Mobilcer Q microcrystalline wax available from Mobil Chemical Company. This material is an acid type aqueous emulsion of microcrystalline wax, where the wax has a melting point of 160° F., and where the emulsion has an average particle size of 2 micron, and a solids content of 50.5 percent by weight, and an emulsion density of 7.9 and a pH of 6.8. Preferably, the amount of wax present in the coating composition is in the range of up to about 5 weight percent of the aqueous coating composition. Any suitable solids and dispersants or emulsifiers having a suitable HLB value as known to those skilled in the art can be used to assist in emulsifying or dispersing the wax in water.

The aqueous treating composition can have, present a diene-containing elastomeric polymer in conjunction with the aforedescribed elastomeric polymer. The diene-containing elastomer is water dispersible or emulsifiable with suitable solvents and emulsifiers known to those skilled in the art of elastomeric latices. This elastomeric material is preferably added to the aqueous coating composition as a latex in an effective flexibilizing amount to assist in flexibilizing the moisture reduced, partially cured residue of the aqueous coating composition to the desired flex modulus. Preferably, the modulus at 100% elongation of a cast film of the aqueous coating composition is in the range of about 200 to 8,000 psi and most preferably, about 800 to about 5,000 psi. Such an aqueous coating composition when moisture-reduced and partially cured as an impregnant in the bundle of filament provides the desired flexibility. The amount of the elastomeric latex that is used is always an amount that will not interfere with any compatibilizing amount of the elastomeric polymer for compatibility with the polymeric matrix coating that subsequently coats any fabrics prepared from the flexible bundle of filaments. When the elastomeric polymer has present any polymer functionality, branching or aromaticity that would increase the crystallinity of the elastomeric polymer or increase the Tg of the elastomeric polymer, the diene-containing elastomeric latex must be present in the coating composition. The diene-containing elastomeric latex is prefereably essentially free of any vinyl pyridine monomeric or repeating units in the polymer. The vinyl pyrridine tends to make the elastomer too stiff for increasing the flexibility of the moisture reduced, partially cured residue on the flexible bundle of filaments.

Nonexclusive examples of suitable diene-containing elastomers include: polybutadiene homopolymer, and carboxylated styrene-butadiene copolymers or any other non-selfcrosslinkable elastomer. The term non-selfcrosslinkable as used herein refers to a polymeric material that cannot undergo intramolecular or internal crosslinking with itself but can undergo intermolecular or external crosslinking with other materials. The intramolecular crosslinking means one part of the same molecule or polymeric chain crosslinks with another part of the same molecule or chain. Here, the term "chain" includes the polymeric backbone chain and pending groups. Suitable examples of non-selfcrosslinkable elastomers include: elastomeric reaction products formed by the reaction of 1,3-diene hydrocarbon monomers such as butadiene-1,3; isoprene, 2,3-dimethyl-1,3-butadiene, 2-2ethyl-1,3-butadiene and the like alone as homopolymers or in mixtures as interpolymers; or ethylene-propylene-diene rubbers (EPDM) produced in a suitable manner from such dienes as dicyclopentadiene, 5-ethylidene-2-norborene, 1,4-hexadiene,5-methylene-2-norborene interpolymerized with ethylene and an alpha-mono-olefin having from 3 to 20 carbon atoms such as propylene; nitrile rubber such as nitrile butadiene latex; or butyl rubber which is a commercial name for copolymers of isobutylene with small amounts of butadiene or isoprene or mixtures thereof. Another elastomer that may be used is chloroprene or neoprene. All of these elastomeric materials are preferably used in their latex form. The diene-containing elastomeric latex is always present in the aqueous coating composition when the polar comonomers for the ethylene-containing interpolymer is vinyl chloride, carbon monoxide, and vinyl fluoride. When polybutadiene homopolymer latex or similar materials are used, the amounts can range from less than 20 percent to greater than 40 percent based on the ethylene-containing interpolymer in the aqueous coating composition. Amounts less than 20 percent give diminished benefits in flexibility as the amount approaches 0. Amounts greater than 40 weight percent provide adequate flexibility but increase the amount of tackiness of the moisture-reduced, partially cured residue on the bundle of filaments. If alternative measures are not pursued in reducing such tackiness, then the amount of polybutadiene homopolymers should not be too much greater than 40 percent in order to maintain the less tacky nature of the impregnated flexible bundle of filaments. To assist in maintaining a less tacky nature to the film, the amount of styrene in a carboxylated styrene butadiene copolymer can be increased. Increasing the amount of styrene from about 60 weight percent to about 84 weight percent is an example of an approach to decreasing the tackiness of the resultant residue.

A nonexclusive example of a commercially available diene-containing elastomer latex that can be used includes a 1,3-polybutadiene homopolymer latex available under the trade designation "LPM-6290" from Goodyear Tire and Rubber Company having a total solids of 43 to 46 percent, a pH of 8 to 9.5, a maximum viscosity of 6,000 centipoise (RFT 1 at 20 rpm), a maximum coagulum of 0.05 percent max and a mechanical stability of 55 to 75 milligrams and surface tension of around 58 to 74 dynes per centimeter, and particle size in the range of 500 to 2,000 angstroms and a maximum gel content of 25 percent. Other nonexclusive examples of non-selfcrosslinkable elastomeric, latices are those available from Polysar in Monaca, Pennsylvania under the trade designation Dylex latex 55E having a percent volatiles by volume of 40 to 51 and a formula of $C_7H_6-CH_2+C_4H_6+CCHO_2$, and the Polysar carboxylated styrene butadiene latex having 84 percent styrene content.

The aqueous coating composition having present the elastomeric polymer and crosslinking material and water need not having present all of the optional ingredients such as the wax, plasticizer, diene-elastomer and the like except in regard to the presence of certain polar comonomers in the ethylene-containing interpolymer as aforementioned. When the diene-containing elastomeric material essentially free of vinyl pyridine is present in the coating composition, it is preferred to have present only one of each of the dispersed microcrystalline wax and dispersed plasticizer.

Another suitable flame retardant, which may assist in curing the polyurethane is an aqueous dispersion of a brominated epoxy polymer. A suitable example is the brominated epoxy resin dispersion available from Celanese Corporation under the trade designation RDX-49630. This material is a 60 percent dispersion of a brominated epoxy resin in water, where the epoxy resin contains approximately 20 percent by weight bromine without any organic solvents being present. The viscosity of this material at 25° C. is 10,000 centipoise with a weight per gallon of 10.1 and a weight per epoxide of 450 and a pH of 7.2. When this epoxy resin is used in the aqueous coating composition, it can be cured with curing agents such as dicyandiamide, various substituted imidazoles and aliphatic means. A suitable curing agent is that available from Celanese Corporation under the trade designation Epicure 8525 polyamine curing agent. This latter material has a viscosity of 800 centipoise at 75° C. and an equivalent weight on solids of 127 and pounds per gallon of 8.1.

The aqueous coating composition can be prepared by adding all of the components sequentially or simultaneously to the desired volume of water with appropriate emulsifiers for any of the material to be emulsified or dispersed in water. Preferably, the materials that are not water soluble are preemulsified or dispersed with suitable solvents and emulsifiers with appropriate HLB values as known to those skilled in the art and then added to formulate the aqueous coating composition. Most preferably, the aqueous dispersion of the polyurethane polymer has added to it any aqueous dispersed plasticizers and aqueous dispersed waxes and lubricants, fire retardants and the like. The crosslinking material which is in a diluted aqueous medium is added to the elastomeric polymer dispersion or mixture of elastomeric polymer and any plasticizers, lubricants and/or fire retardants. The aqueous coating can be further diluted with water to achieve a desired volume of material to give the aqueous coating composition the total solids and viscosity required for impregnating the bundles of filaments.

The aqueous impregnating composition is applied to the bundles of filaments which includes strands, bundles of strands, yarns twisted and untwisted and merely bundles of monofilaments. The application can be by dip coating or die coating or any other process known to those skilled in the art for applying coatings to groups of filaments. For example, the bundle of filaments can be dipped into a bath containing the aqueous impregnating composition or the bundle can contact a kiss roll or other applicator device that carries it to contact the bundle of filaments. Also a die coating arrangement can be employed, where the bundle of filaments is pulled, pushed or stuffed through permament or adjustable orifices. This operates effectively to open the strand immediately in advance of the orifice to expose the innermost regions of the glass fiber bundle to the liquid impregnant located in the container with the orifices. Before the bundle contacts the impregnant, it can ride over a bar or similar device under tension to spread the fibers in the bundle for maximum separation and better impregnation. The sized filaments have the sizing composition which does not provide too much integrity between the filaments when they are gathered into groups or bundles of filaments so that upon the application of a disruptive force, before or during dip or die coating, the filaments separate somewhat one from the other to assist in allowing the coating composition to surround and enter the groups or bundles of filaments. Hence, the sizing assists in producing an impregnation preferably to a degree so that every filament in the bundle or in bundled strands has a substantial portion of its surface covered with the aqueous coating composition so that when the aqueous coating composition is dried and partially cured, the filaments in the bundles will be separated from each other.

The bundles of filaments with the treatment of the aqueous coating composition are dried to partially cure and reduce the moisture content of the aqueous coating composition. Any method known to those skilled in the art for curing crosslinkable materials may be used to dry and cure the coated and impregnated bundle of filaments. It is preferred that the drying is a non-dielectric type drying and that the moisture is reduced to a moisture content in the range of less than around 1 to about 2 percent of the bundles. This and partial curing are accomplished by drying at suitable temperatures and times to result in the desired moisture reduction and partial cure. Preferably, the drying is conducted at a temperature in the range of about 400° F. to about 500° F. (200°–260° C.) for a time in the range of about 10 seconds to about 60 seconds or any equivalent temperature and time relationship to accomplish a similar degree of moisture reduction and partial cure.

The partially cured coated bundle of filaments is flexible enough to undergo myriad fabric producing processes. Nonexclusive examples of fabric producing processes include weaving, nonwoven fabrics, knitted, braided, weft-knit fabrics such as those produced on the Mayer or Libya weft insertion fabric machine. On this type of machine, the fabric is a bi-directional crosslaid warp and weft structure, where the weft yarns do not interlace as in traditional woven fabrics. A "knit stitch" is run in the warp machine direction to lock the fabric together. For the weaving operation, plain weave, satin weave or any other type of weaving for producing a fabric as known to those skilled in the art can be used.

The fabric whether woven or nonwoven or knitted or braided can be coated with numerous types of coatings by myriad processes or remain uncoated. Examples of suitable polymeric coatings include vinyl resins such as polyvinyl chloride, polyethylene and ethylene copolymers, polyurethanes, phenolic resins, melamine formaldehyde resins and elastomeric materials such as chlorosulfonated polyethylene, chlorinated polyethylene, and polymers of ethylene propylene diene monomers, and Hypalon ® elastomers and silicone polymers. These types of polymers can be coated onto fabrics of the flexible bundle of filaments by impregnation or saturation processes and surface coating processes such as solvent-containing coatings and 100 percent solids coatings and lamination processes of preformed films or sheets. For example, when a plastisol, 100 percent solids coating, is used, an application of a first coating of poly(vinylchloride) latex is applied to the fabric to improve adhesion of subsequent plastisol coatings. After the application of the plastisol coating paste to the fabric, the fabric is heated to a temperature usually around 350 to 400° F. (177°–205° C.) to permit the resin particles to form a continuous phase over the fabric and to actually contact in the interstices between the fabric. The polymeric coating then cools to a tough coherent film at room temperature. The fusion process is so quick that the coated fabrics may be cooled as soon as the required fusion temperature is obtained. In addition to the polymeric material, various pigments or fillers can be included and the polymeric materials may be modified by plasticizers and solvents.

The polymeric coating and preferably the polyvinyl chloride coating also can be applied by any impregnation process known to those skilled in the art such as passing the fabric over a knife-over-roll coater. Also any wet coating process known to those skilled in the art can be used such as passing the fabric over sequential knife coaters or through a floating knife coater with a support channel. Also blanket knife coaters and inverted knife coaters and levelon coaters with reverse smoothing rolls can be used as can engraved-roll or rotogravure coating units. In applying the plastisols, any dry or 100 percent solids coating process known to those skilled in the art can be used. For instance, hot melt coating can be used or any modified wet coating process, where there is not any solvent evaporation. In addition, cast-coating techniques can be used as well as metal-belt precast coaters. Also a dry powder resin coating method such as hot calendar-coating and extrusion-coating can be used. Also wet lamination and dry lamination involving the union of the fabric with a film or sheet of the polymer, which has been formed in a separate operation, can be used. In the lamination processes, the film or sheet can be formed by calendaring, by extrusion, or by casting in a separate operation and laminated to the fabric base. With these processes an adhesive coating can be applied to the plastic sheet prior to the application of pressure against the fabric and plastic sheet or the plastic sheet can act as the thermoplastic adhesive itself and it can be heated to produce the adhesion and, afterwards, brought into contact with the fabric while hot. The use of the adhesive application is performed in the multiple-ply drum lamination process. Also with foamable polymeric materials, the thermoplastic foam lamination process can be used.

In addition to the woven or knitted fabrics or nonwoven scrim end use applications, numerous specialty products can be produced from the impregnated bundles of fibers of the present invention. Such specialty products include ropes and cordage, dryer felts, conveyor belts, reinforcement mesh for concrete and gypsum, webbing and strapping, slings, electrical sleeving and harnesses and reinforced tapes, cables for aerial dropwires, mattress ticking and fiber optic cables. In most of these specialty products area, the aqueous coating composition would have a lubricant present and preferably a silylated lubricant for facile braiding and weaving of the resultant coated bundle of glass fibers. Also the impregnated bundles of filaments are readily receptive to both aqueous and nonaqueous dying processes.

FIG. 1 depicts a coated fabric of the present invention, where numeral 12 shows the fabric comprised of the flexible impregnated bundle of glass fibers of the present invention and numerals 11 and 13 indicate the polyvinyl chloride sheets or films that are laminated together sandwiching the fabric in between the laminate sheets. Ordinarily, the thickness of the coated fabric ranges from even less than 0.01 to greater than 0.06 inch (0.025 cm –0.15 cm), and the amount of coating on a unit area of the fabric varies widely, but it is usually around 5 to about 50 ounce/yd$^2$ (119–1700 gs/m$^2$).

Figure 2:
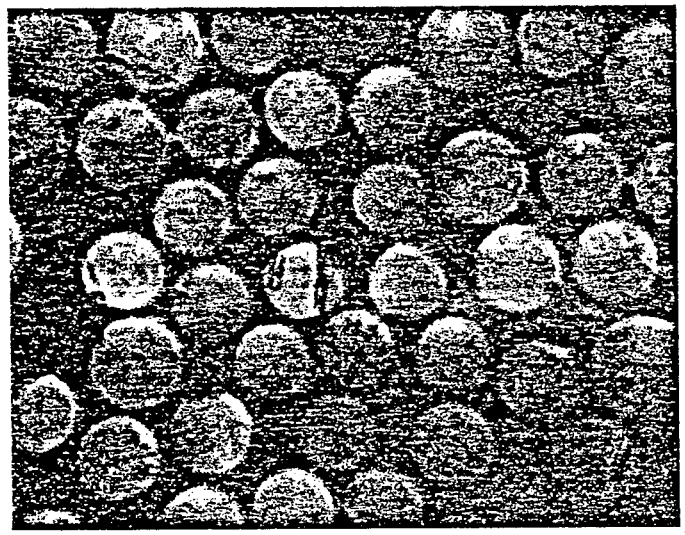
FIG. 2 is a photograph of a microscopic, enlarged cross-section of the impregnated bundle of treated glass fibers.

FIG. 2 is a photograph depicting a cross-sectional view of the coated bundle of glass fibers of the present invention. The cross-section is magnified 600 times on a conventional microscope. The specimen was prepared by making a .01 mil cross-sectional cut with a microtone cutter of the pigmented impregnated bundle of glass filaments of the present invention. The specimen was embedded in epoxy resin. Numeral 14 shows the glass filaments with the residue of the sizing composition and numeral 15 depicts the partially cured, moisture reduced coating impregnating the bundle of sized glass fibers. As noted from FIG. 2, the majority of glass filaments are not actually touching each other with a glass surface to a glass surface, but are separated from one another by the partially cured, moisture reduced coating.

PREFERRED EMBODIMENT OF THE INVENTION

In the preferred embodiment of the present invention, the filaments of glass fibers are usually of the "E-glass" or "621-glass" variety. The glass fibers are formed by attenuation from molten streams of glass issuing forth from orifices in a bushing of a glass batch melting furnace. After the filaments have cooled below the boiling point of water, and aqueous sizing composition is applied to the fibers. The aqueous sizing composition is a nonstarch textile size having a 50/50 blend of polyalkylene polyol available under the trade designation Pluracol® V-7 polyol and polyoxyalkylene polyol available under the trade designation Pluracol® V-10 polyol from BASF Wyandotte. The amount of the blend is in the range of about 0.5 to about 5 weight percent of the aqueous treating composition and most preferably, about 1 to about 3 weight percent. A silane coupling agent is preferably a lubricant modified amino silane coupling agent available under the trade designation Y-9072 silane from Union Carbide Corporation. This material is present in an amount in the range of about 0.01 to about 2 weight percent of the aqueous treating composition. The preferred cationic lubricant that is present in the aqueous size is a polyamine lubricant commercially available as an acidified cationic fatty acid amide under the trade designation Emery 6760-U. This material is present in the aqueous treating composition in an amount of about 0.1 to about 4 weight percent of the aqueous treating composition. Total solids of the aqueous treating composition can be a convenient solids range for sizing compositions to be applied at a proper and desired LOI to glass fibers. Preferably the total solids is in the range of around 3 to around 20 weight percent. It is preferred to apply the aqueous treating composition to the glass fibers in such a manner to give an LOI for the glass fibers in the range of about 0.1 to about 1 percent and most preferably about 0.5 to about 0.8 percent.

The exact components of the aqueous impregnating composition to be applied to the glass fibers treated with the aqueous nonstarch sizing composition depends upon the end use of the coated glass fibers, but the impregnating composition preferably is a one phase polymeric system. When the coated glass fibers are used in cable applications like support cables for fiber optics, the aqueous coating composition has the following formulation:

| | |
|---|---|
| Aqueous dispersion of polyurethane polymer (Witco 290-H) | 1207 grams |
| Water | 1034 grams |
| Butyl benzyl phthalate (Sanitizer 160) | 138 grams |
| Polyoxyethylene sorbitan monolaurate (ICI) (Tween 21 from ICI America, Inc.) | 17 grams |
| Hot Water | 347 grams |
| Water | 2586 grams |
| Aqueous dispersion of polyurethane polymer (Mobay XW 110) | 172 grams |
| Aqueous epoxy dispersion (Witco XW) | 94 grams |

The aqueous coating composition was prepared by combining deionized water and the polyurethane dispersion to a premix tank and stirring for 10 minutes. All of the valves of a main mix tank were closed and an agitator was started and the diluted aqueous dispersion of polyurethane was introduced into the main mix tank. The plasticizer was emulsified in a premix tank with an Eppenbach mixer by adding the plasticizer and the emulsifier and starting the Eppenbach and adding hot deionized water at a rate of 1 to 2 grams per minute until the emulsion was inverted. When inversion was complete, the water addition rate was increased until all of the specified water is added. The emulsified plasticizer is then added to the main mix tank. Deionized water was added to a premix tank and the aqueous polyurethane dispersion available as XW 110 emulsion from Mobay Chemical Company was added. This material is a hazy off-white anionic dispersion of an aliphatic polyester urethane polymer in water with 15% by weight N-methyl-2-pyrrolidone and it is fully reacted with no free isocyanate. The dispersion is 35 percent by weight solids with a specific gravity at 25° C. of 1.04 and a pH of 8.3. Typically film properties include tensile srength of 6,600 psi elongation at break 170%, yield modulus 5700 psi, modulus at 100% elongation of 5,200%. Also the aqueous epoxy dispersion was added and the mixture was stirred for around 10 minutes. This diluted mixture of aqueous polyurethane and epoxy dispersions was added to the main mix tank. The formulation was diluted to a final volume and stirred for around 25 minutes. The aqueous coating composition was applied in a kiss roll coating operation with an applicator roll speed, and line speed of the bundle of filaments adjusted to give about 10 to about 12 percent by weight pick up of the impregnant. The bundles of filaments are K-15 1/0 bundles.

In alternative embodiments, the K-15 3/0 strand construction need not be the only strand construction used for the coated bundle of glass fibers. For instance, K-15 1/0, 2/0, 3/0, 4/0 and K-37 and H-25 1/0 and G-37 1/0 and G-75 1/0 and G-150 1/0 and D-225 1/0 and D-450 1/0 and M-450 are just a few examples of other types of strand constructions that can be used.

When the partially cured moisture reduced coated bundle of glass fibers are to be used for braiding and weaving into a fabric for electrical harness or sleeve applications, the aqueous coating composition preferably has the following formulation:

| | |
|---|---|
| Aqueous dispersion of polyurethane (Witco 290-H) | 7000 grams |
| Silylated lubricant (Y-9662) | 100 grams |
| Cold water | 5000 grams |
| Trixylyl phosphate (Phosflex 179A) | 700 grams |
| Butyl benzyl phthalate plasticizer (Sanitizer 160) | 600 grams |
| Polyoxyethylene sorbitan monolaurate (Tween 21) | 100 grams |
| Water (warm, distilled) | 500 grams |
| Melamine formaldehyde resin (Resimene841) | 400 grams |
| Water (distilled) | 600 grams |
| Solution of toluene sulfonic acid of isopropanol 40% acid and 60% alcohol (Cycat 4040) | 10 grams |
| Aqueous dispersion of brominated epoxy polymer (RDX 6315) | 840 grams |
| Water | 800 grams |
| Polyamine epoxy curing agent (Epicure 8525) | 30 grams |
| Antimony trioxide flame retardant | 200 grams |
| Water | 800 grams |

In a main mix tank the aqueous polyrethane dispersion was added along with the silylated lubricant and cold distilled water with agitation. In a premix tank, the mixture of plasticizers was emulsified with warm distilled water and this mixture was added to the main mix tank. In a premix tank, the melamine formaldehyde was combined with the acid catalyst and water and this mixture was added to the main mix tank. In another premix tank, the aqueous dispersion of brominated epoxy polymer was combined with the polyamine curing agent and water and this mixture was added to the main mix tank. The flame retardant was combined with water in a premix tank and added to the main mix tank.

The total solids of the formulation was 18 percent and the total volume was 9 gallons. This aqueous coating formulation was applied to the aforementioned sized glass fibers in a similar manner as that of the aqueous coating formulation of the preferred embodiment.

The following examples further illustrate the embodiments of the present invention and should not be construed as limiting the present invention which is properly delineated in the claims.

Tables 1 and 2 present 16 examples of an aqueous coating formulations in accordance with the present invention. These aqueous coating formulations, all of which had viscosities in the range of 4–5 centipoise, were applied to sized glass fibers having the sizing composition of the preferred embodiment in the same manner as for the preferred embodiment. The formulations of Example 8 is the preferred formulation for impregnated yarns that are prepared into fabric and coated with polymeric material to produce a coated fabric. This formulation was prepared by adding the deionized water for the polyurethane dispersion to a premix tank and adding the polyurethane dispersion. This combination was stirred for 10 minutes and transferred to a main mix tank. The plasticizer was emulsified in the same manner as described for the formulation shown on page 34. The melamine formaldehyde and water and acid catalyst were added in a similar manner as described for the formulation of pages 34 and 35. As the last ingredient, the silylated lubricant was mixed with deionized water in a premix tank and added to the main mix tank.

A number of impregnated yarns produced with the coating compositions of Table 1 were tested according to the tests in Table 3. The breaking strength test for original samples, samples aged in humidity for 14 days and samples subjected to 120° F. at 98 percent relative humidity for 28 days and samples water aged at room temperatures for 28 days and the flex resistance tests with the MIT flex folding test for samples that were original, humidity aged at 28 days, and water aged at 28 days were performed in accordance with standard test methods for breaking strength and flex resistance. Unimpregnated yarns of sized glass fibers that were sized with the aqueous sizing composition of the preferred embodiment were tested for original breaking strength and flex properties, and the yarns gave values of 35.5 psi and 60 cycles respectively. The specimens tested in Table 2 were conditioned at 78° F. (25° C.) and 55 percent relative humidity for 24 hours before testing to simulate some storage conditions. For the flex folding test of Table 3, a 0.125 lb load was used with a 0.03 inch (0.08 cm) mounting head with a single strand being tested. As shown in Table 2, the coating compositions impregnating the bundles of filaments of the present invention have improved flex properties.

Table 4 presents performance data for both impregnated and unimpregnated and uncoated bundles of glass filaments. The filaments for both varieties of bundles were sized with the aqueous sizing composition of the preferred embodiment. The unimpregnated and uncoated bundles were not treated with the aqueous impregnating coating used in the present invention. The impregnated bundles of sized glass fibers were impregnated with the polyurethane impregnants of Examples 8 and 13–16 in Table 2. The performance data of Table 4 are for the impregnated bundles of glass fibers under the first section and for fabric properties of fabrics woven with the impregnsted bundles of fibers under the second section. The tests conducted in Table 4 were all conducted in accordance with standard test procedure for these tests as follows:

| Test | Procedure |
|---|---|
| Impergnated bundle strength including: tensile, Young's modulus, and failure elongation | American Society of Testing Materials (ASTM) test D-2970 |
| Flex life | ASTM-D-2176 with 0.5 lb (226.8 gm) load |
| Fabric breaking strength | ASTM-D-1682 |
| Fabric torque test | ASTM-D-2262 |
| Fabric MIT Flex life | ASTM-D-2176 with 0.5 lb (226.8 gm) load per end |
| Stoll flex test | ASTM-D-1175 with 15 ends per specimen |

The crease tensile test involves folding a fabric of the impregnated and unimpregnated and uncoated bundle of filaments on itself perpendicular to the warp direction and placing a 10 lb (4.54 Kg) weight on the crease for 18 hours. The tensile strength of the creased fabric is tested according to ASTM-D-1682.

Tables 3 and 4 show the improvement of the impregnated bundle of filaments in strength, flexibility, and abrasion resistance for application in numerous end uses. The abrasion resistance is shown in the crease tensile test where under the severe bending conditions of this test, the fabric of impregnated yarn retained around 60 percent of its original tensile strength.

Also the impregnated bundle of filaments showed good receptivity to dyes.

A 10×10 plain weave fabric of the impregnated bundles of Example 1 was immersed in an aqueous dye bath containing 3.3 gm/liter of dye. The fabric was stirred in the bath for around 2 minutes and removed and rinsed in both running hot water and running cold water. The fabric was scoured in a water bath containing Triton-X-100 octylphenoxypolyethoxyethanol. Subsequently, the fabric was rinsed in both running hot water and running cold water.

This procedure was performed twice on separate similar fabric samples. One procedure was conducted with the basic dyestuff, Remacryl Red FGL from American Hoechst Corporation. The second procedure was conducted with the acid dyestuff, Lonateryl Bleu B, also from American Hoechst Corporation. Both procedures produced well dyed fabrics.

The present invention enables the production of bundles of filaments like glass fibers, where the advantageous properties are maintained, where such properties include: high tensile strength, high tear strength, resistance, dimensional stability like high modulus to minimize stretch under load and yarn stability unaffected by temperature and humidity changes, resistance to chemical attack, resistance to UV degradation and flammability resistance. In addition, improvements are obtained in the properties of flexural strength and abrasion resistance.

TABLE 1

| | Example 1 gms/wt % Solids | Example 2 gms/wt % Solids | Example 3 gms/wt % Solids | Example 4 gms/wt % Sol | Example 5 gms/wt % Solids | Example 6 gms/wt % Solids | Example 7 gms/wt % Solids |
|---|---|---|---|---|---|---|---|
| Ethylene vinyl acetate copolymer | 10,000/72.6 | 7175/73 | 7175/70 | 7175/51.8 | 10,000/81.2 | 10,000/81.2 | 7175/82.3 |

TABLE 1-continued

|  | Example 1 gms/wt % Solids | Example 2 gms/wt % Solids | Example 3 gms/wt % Solids | Example 4 gms/wt % Sol | Example 5 gms/wt % Solids | Example 6 gms/wt % Solids | Example 7 gms/wt % Solids |
|---|---|---|---|---|---|---|---|
| (Air Flex 410 colpolymer 47–55% solids) |  |  |  |  |  |  |  |
| Microcrystalline wax (Petrolite Corp.) 40% solids | 400/2.3 | 90/1.8 | 90/.7 | 90/.5 | 400/2.6 | 400/2.6 | 90/.8 |
| Mobilcer Q (50.5 solids) | 430/3.1 | 430/4.4 | 430/4.2 | 430/3.1 | — | — | 430/.5 |
| Water | — | — | — | — | — | — | 3500 |
| Nonylated phenol phosphite (Mark 1178 Argus) | 50/.7 | 36/.7 | 36/.7 | 36/.5 | 50/.8 | 50/.8 | 36/.8 |
| Polyoxyethylene sorbitan monlaurate (Tween 21) | 50/.7 | 26/.5 | 26/.5 | 26/.3 | 50/.8 | 50/.8 | 26/.6 |
| Xylene triphosphate (Phosflex) | 500/0.7 | — | — | — | — | — | — |
| Polyoxyethylene stearate Myrj 52 | 75/1.1 | 50/1 | 50/1 | 50/.7 | 75/1.2 | 75/1.2 | 50/1.1 |
| Hot Water | — | 60 | 60 | 60 | — | — | 60 |
| Cold Water | — | 1435 | 1435 | 1435 | — | — | 1435 |
| NH4OH (28% solids) | 15/0.6 | 36/.2 | 36/.2 | 36/.1 | — | — | 36/.2 |
| Melamine formaldehyde resin (65% solids) | 500 | 360/4.8 | — | 360/4.6 | 645/5.9 | 500/5.3 | 500/5.3 |
| Water | 4.7 | — | 460/54 | — | 7,800 | — | — |
| Epoxidized soybean oil (Drapex 6.8%) | — | 160/3.2 | 160/3.1 | 160/2.3 | — | — | 160/3.7 |
| Polybutadiene latex | — | 1435/14.6 | 1870/18.2 | 2870/20.7 | — | — | — |
| Carboxylated styrene butadiene latex |  |  |  |  |  |  |  |
| Dylex 55% Styrene | 1000/7.3 | — | — | 717/5.2 | 1000/8.1 | — | — |
| Dylex 84% styrene | — | — | — | — | — | 1000/8.1 | — |
| Total Solids (% by weight) | 20 | 20 ± 5 | — | 20 ± 5 | 18 | 18 | 23 |
| Viscosity (cps) | 4–5 | — | — | — | 4–5 | 4–5 | 4–5 |
| Total Volume | 34 L/9 gal | 19 L/5 gal | 19 L/5 gal | 19 L/5 gal | 34 L/9 gal | 34 L/9 gal | 19 L/5 gal |

TABLE 2

| Impregnated Coating Formulations | | | | |
|---|---|---|---|---|
| | Examples | | | |
| | 8 Kg/Wt % Sol/Wt % Aq | 9 Grams/Wt % Sol/Wt % Aq | 10 Grams/Wt % Sol/Wt % Aq | 11 Grams/Wt % Sol/Wt % Aq |
| Polyurethane dispersion Witco 290H (65% solids) | 329.4/69.4/14 | 1207/71.3/15.9 | 7000/157.2/13.3 | 1207/79/15.9 |
| Water (deionized) | 454.2 L | 1034 | 5000 | 1034 |
| Butyl benzyl phthalate plasticizer (Sanitizer 160) | 37.65/12.2/2.5 | 138/12.5/2.8 | 800/10/2.3 | — |
| Trixylyl phosphate (Phosflex 179A) | — | — | 700/8.8/2 | — |
| Polyoxyethylene sorbitan | 4.7/1.5/.3 | 17/1.5/.3 | 50/.6/.1 | — |
| Water (warm) | 106 L | 345 | 1000 | — |
| Melamine formaldehyde resin Resimene 841 | 47.1/15.3/3.1 | — | 1000/12.6/2.9 | 172/17.3/3.5 |
| Melamine formaldehyde resin Resimene 970 | — | — | 500/6.3/1.5 | — |
| Water | 151 L | — | 2000 | 517 |
| Acid catalyst (Cycat 4040) Solution of toluene sulfonic acid in isopropanol (40% acid/6070H) | .094/.03/.003 | — | 30/.2/.03 | 0.3/.03/ |
| Acetic acid | — | — | — | 5.5 ml |
| Organosilane ester lubricant Y-9662 | 4.7/1.5/.3 | — | 100/1.3/.3 | — |
| Gamma-methacryloxypropyl-trimethoxy silane (A-174) | — | — | — | 55/3.9/.78 |
| Polyurethane resin dispersion (Mobay XW-100) 33% | — | 345/10.3/2.3 | — | — |
| Epoxy resin aqueous dispersion (Witcobond XW) 50% | Antimony trioxide fire retardant | 94/4.3/1 | 200/1.3/.3 | 100/1.3/.3 |
| Water | — | — | 1000 | — |
| Polyoxythylene sorbitan monolaurate (Tween 21) | — | — | 50/.63/.1 | — |
| water to desired volume of | 1514.16 L (400 gal) | 4.92 L | 34.1 L | 4.92 L |
| Solids % | 19 ± 0.5 | 20 ± 2 | 23.3 | 20 |
| pH | 8.5 | — | — | — |

| | Examples | | | | |
|---|---|---|---|---|---|
| | 12 Grams/Wt % Sol/Wt % Aq | 13 Grams/Wt % Sol/Wt % Aq | 14 Grams/Wt % Sol/Wt % Aq | 15 Gram/Wt % Sol/Wt % Aq | 16 Grams/Wt % Sol/Wt % Aq |
| Polyurethane dispersion Witco 290H (65% solids) | 1207/82/15.9 | 1207/80/13 | 1207/77.3/13 | 1207/69.8/13 | 1207/80/13 |
| Water (deionized) | 1034 | 1034 | 1034 | 1034 | 1034 |
| Butyl benzyl phthalate plasticizer (Sanitizer 160) | — | 138/14/2.3 | 138/13.6/2.3 | 275/24.5/4.51 | 138/14/2.3 |
| Trixylyl phosphate (Phosflex 179A) | — | — | — | — | — |

TABLE 2-continued

| Impregnated Coating Formulations | | | | | |
|---|---|---|---|---|---|
| Polyoxyethylene sorbitan monolaurate (Tween 21) | — | 17/1.7/.3 | 17/1.7/.3 | 17/8.5/.3 | 17/1.7/.3 |
| Water (warm) | | 345 | 345 | 345 | 345 |
| Melamine formaldehyde resin Resimene 841 | 172/18/3.5 | — | — | — | 43/4.4/.7 |
| Melamine formaldehyde resin Resimene 970 | — | — | — | — | — |
| Water | 517 | 517 | 517 | 517 | 517 |
| Acid catalyst (Cycat 4040) | 0.3/0.3 | — | — | — | — |
| Solution of toluene sulfonic acid in isopropanol (40% acid/6070H) | | | | | |
| Acetic acid | — | — | — | — | 13 |
| Organosilane ester lubricant Y-8662 | — | — | — | — | — |
| Gamma-methacryloxypropyl-trimethoxy silane (A-174) | — | — | — | — | — |
| Polyurethane resin dispersion (Mobay XW-100) 33% | — | — | 96/2.8/.5 | — | — |
| Epoxy resin aqueous dispersion (Witcobond XW-100) | — | 94/4.6/.8 | 94/4.6/.8 | 94/4.2/.8 | — |
| Antimony trioxide fire retardant | — | — | — | — | — |
| Water | | | | | |
| Polyoxyethylene sorbitan monolaurate (Tween 21) | | | | | |
| Water to desired volume of 4,921 ml | 6,057 ml | 6,057 ml | 6,057 ml | 6,057 ml | |
| Solids % | — | 16 | 16 | 18.5 | 16.2 |
| pH | — | — | — | — | — |

TABLE 3

EVALUATION OF EXPERIMENTAL VINYL COATED YARNS TENSILE AGING STUDY

| YARN NO. | LOI | ORIGINAL | HUMIDITY AGED; 120° F. & 98% RH 14 DAYS | HUMIDITY AGED; 120° F. & 98% RH 28 DAYS | WATER AGED, RT 28 DAYS |
|---|---|---|---|---|---|
| Ex 1 | 12 | 66.0 | — | 66.2 | 66.0 |
| Ex 2 | 12 | 51.9 | 47.9 | 41.3 | 46.4 |
| Ex 3 | 12 | 63.1 | 58.5 | 59.1 | 63.6 |
| Ex 4 | 12 | 68.0 | 64.5 | 62.8 | 67.3 |
| Ex 5 | 12 | — | — | — | — |
| Ex 6 | 12 | — | — | — | — |
| Ex 7 | 12 | 65.9 | 54.1 | 59.6 | 53.6 |

FATIGUE RESISTANCE STUDY-

TABLE 3-continued

MIT FLEX FOLDING TEST
NUMBER OF CYCLES TO FAILURE

| | ORIGINAL | HUMIDITY AGED;* 28 DAYS | WATER AGED; 28 DAYS |
|---|---|---|---|
| Ex 1 | 701 | 759 | 698 |
| Ex 2 | 437 | 346 | 336 |
| Ex 3 | 792 | 675 | 741 |
| Ex 4 | 1083 | 1017 | 932 |
| Ex 5 | 948 | — | — |
| Ex 6 | 1100 | — | — |
| Ex 7 | 501 | 752 | 811 |

*Aged at 120° F. and 98% Relative Humidity

TABLE 4

PERFORMANCE OF IMPREGNATED BUNDLES OF GLASS FILAMENTS

Physical Properties of Bundles

| Samples | Tensile Strength psi/denier | Young's Modulus | Failure Elongation (%) | Flex Life (cycles) |
|---|---|---|---|---|
| Sized uncoated, unimpregnated bundles K-15 1/0 | $1.6 \times 10^5/6.0$ | $7.8 \times 10^6$ | 3.5 | 100 |
| Impregnated K-15 1/0 Ex. 8 Table 2 | $3.1 \times 10^5/9.8$ | $7.8 \times 10^6$ | 4.5 | 2200 |
| Impregnated K-15 1/0 Ex. 13 Table 2 | — | — | — | 2920 |
| Impregnated K-15 1/0 Ex. 14 Table 2 | — | — | — | 1355 |
| Impregnated K-15 1/0 Ex. 15 Table 2 | — | — | — | 2609 |
| Impregnated K-15 1/0 Ex. 16 Table 2 | — | — | — | 2010 |

Physical Properties of Fabric Made from Bundles of 10 x 10 Plain Weave

| | Denier | Wt. Oz/yd$^2$ | Breaking Strength lb/15 ends | Tongue Tear lb/3" wd Sample | Stoll Flex-Abrasion (cycles) | MIT Flex Life (cycles) | Crease Tensile Strength lb/15 ends |
|---|---|---|---|---|---|---|---|
| Sized uncoated, unimpregnated bundles K-15 1/0 | 3000 | 7.8 | 532 | 8 | 316 | 430 | — |
| Impregnated K-15 | 3250 | 8.5 | 716 | 36 | 2000 | 4200 | 566 |

TABLE 4-continued

PERFORMANCE OF IMPREGNATED BUNDLES OF GLASS FILAMENTS

I/O Ex. 8 Table 2

We claim:

1. A flexible bundle of high modulus, low elongation fibers, having a modulus of elongation of at least $7 \times 10^{-6}$ psi and an elongation at break of less than 5 percent comprising:
   (a) a plurality of fibers constitutiing a bundle of fibers having a moisture reduced residue of an aqueous chemical sizing composition comprising at least a fiber protectorant on a substantial portion of the surfaces of the fibers in the bundle,
   (b) a moisture-reduced, and at least partially cured residue impregnating said bundle of fibers wherein said residue resulted from the aqueous impregnataing composition comprising:
      (1) at least one water soluble, emulsifiable or dispersible elastomeric curable polymer, that is essentially free of hydrocarbon diene and of chlorine functionalities,
      (2) at least one crosslinking material that is water soluble, emulsifiable or dispersible in an effective amount to provide at least partial curing of the residue and
      (3) water in an effective amount to provide said impregnating composition for said bundle of fibers.

2. The flexible bundle of fibers of claim 1, wherein said aqueous chemical sizing composition further comprises the presence of an antistatic agent.

3. The flexible bundle of fibers of claim 1, wherein said elastomeric polymer is a blend of at least two aqueous soluble, emulsifiable or dispersible polymers having film properties with different modulus of elongation at the same percentage of elongation.

4. The flexible bundle of fibers of claim 1, wherein said aqueous impregnating composition further comprises at least one water soluble, emulsifiable or dispersible plasticizer.

5. The flexible bundle of fibers of claim 1, wherein said aqueous impregnating composition further comprises at least one silane coupling agent.

6. The flexible bundle of fibers of claim 1, wherein said moisture-reduced, and at least partially cured residue of the impregnating composition is curable to an extent of up to 10 weight percent on a dry solids basis.

7. The flexible bundle of fibers of claim 1, wherein said moisture reduced, and at least partially cured residue of the impregnating composition also encapsulates the bundle of fibers.

8. The flexible bundle of fibers of claim 1, wherein in said aqueous impregnating composition said crosslinking material is selfcrosslinkable in an effective amount to provide for partial curing of said moisture-reduced, partially-cured residue to result in said residue having a mdoulus at 100 percent elongation of a cast film of said aqueous impregnating coating composition in the range of about 200 to 8,000 psi, with a Shore hardness of around Shore A 60 to Shore A 100 and with an elongation of around 100 to around 800 percent.

9. The flexible bundle of fibers of claim 1, wherein in said aqueous impregnating composition said crosslinking material is present in an effective amount to partially cure the elastomeric polymer which is capable of curing to yield said residue having a modulus at 100 perpcent elongation of a cast film of said aqueous impregnating composition in the range of about 200 to 8,000 psi with a Shore hardness of around A 60 to about A 100 with an elongation of around 100 to around 800 percent.

10. The flexible bundle of fibers of claim 1, wherein said moisture-reduced and at least-partially cured residue has a hardness in the range of Shore A 10 to about Shore D 80 and an elongation of about 500 to about 4,000 psi.

11. The flexible bundle of fibers of claim 1, where the fibers are glass fibers and said aqueous chemical sizing composition further comprises one or more coupling agents.

12. The flexible bundle of fibers of claim 11, wherein the glass fibers are sized with said aqueous chemical sizing composition which has a non-starch fiber protectorant of about 0.5 to about 5 weight percent of at least one water dispersible, high molecular weight polyol selected from the group consisting of polyoxyalkylene polyols and polyalkylene polyols having an average molecular weight of about 300 to about 12,000 and mixtures thereof present as flexible film formers, and has at least one silane coupling agent in an amount of 0.1 to about 2 weight percent, and in addition has about 0.1to about 4 weight percent of a cationic lubricant, and has water in an amount to give a total solids content for said aqueous chemical sizing composition in the range of about 3 to about 20 weight percent.

13. The flexible bundle of fibers of claim 12, wherein said aqueous impregnating composition further comprises a glass fiber lubricant.

14. The flexible bundle of fibers of claim 9, wherein said crosslinking material is one or more methylene donor condensate resins selected from the group consisting of resorcinol formalahyde resins, phenol formaldehyde resins, melamine formaldehyde resins and mixtures thereof.

15. The flexible bundles of fibers of claim 14 in addition having an effective amount of a crosslinking controlling agent in said aqueous impregnating composition.

16. The flexible bundles of fibers of claim 1, wherein said aqueous impregnating composition is at least one aqueous emulsifiable or dispersible microcrystalline wax.

17. The flexible bundles of fibers of claim 16, wherein said microcrystalline wax is hydrocarbon aliphatic wax in an aqueous medium.

18. The flexible bundle of fibers of claim 1, wherein said effective amount of water in said aqueous impregnating composition provides a viscosity in the range of up to about 20 centipoise and a total solids in the range of about 1 to about 25 weight percent to facilitate impregnation of the bundle.

19. The flexible bundle of fibers of claim 1, wherein the elastomeric polymer is selected from the group consisting of elastomeric silicones, fluororubbers, polysulfide polymers and polyethers and wherein said crosslinking material is selected from the group consisting of acetoxy, ketoxime, and alkoxy functional compounds.

20. A flexible bundle of glass fibers, comprising:

(a) a plurality of fibers constituting a bundle, wherein said fibers coated with moisture-reduced residue of an aqueous chemical sizing composition comprising a fiber protectorant and one or more coupling agents, wherein the residue is present in an amount in the range of about 0.05 to about 5 weight percent of the bundle, (b) a moisture-reduced and at least partially cured residue impregnating said bundles of the plurality of fibers, where the moisture reduced residue has a moisture content in the range of about 1 to about 2 percent of the bundle, and where the amount of said residue present is greater than 5 weight percent of the bundle, and where the residue results from said aqueous impregnating composition having:

(1) one or more elastomeric, curable polymers selected from the group consisting of water soluble, emulsifiable or dispersible elastomeric curable polymers essentially free of any hydrocarbon diene funtionality and chlorine functionality which is curable up to about 10 weight percent on a dry basis and present in a predominant amount of solids of said aqueous impregnating composition, (2) one or more crosslinking materials in an effective amount to at least partially cure said curable elastomeric polymer to produce a resultant film of the residue that has a hardness in the range of Shore A 10 to about Shore D 80 and an elongation of about 100 to about 800 percent and a modulus at 500 percent elongation of about 500 to about 4,000 psi, and (3) water in an effective amount to enable said impregnating composition to have a viscosity of around 5 or less for kiss roll type coating application and up to around 10 to 20 centipole at room temperature for die coating application.

21. The flexible bundle of fibers of claim 1, wherein at least one elatomeric polymer, essentially free of diene hydrocarbon and chlorine functionalities, is selelcted from the group consisting of: polyurethane, silicone, fluororubbers, polysulfide polymers, ethylene-propylene rubber, polyethers, and ethylene-containing interpolymers formed from ethylene monomer and one or more polar comonomers selected from the group consisting of vinyl acetate, methyl arcylate, ethyl acrylate, styrene, alpha methyl styrene, methyl methacrylate, acrylamide, methacrylate, n-methyl-N vinyl acetamide, diethyl fumaric, diethyl maleate, n-vinyl pyrrolidone, n-vinyl succinamide, and mixtures thereof.

22. The flexible bundle of fibers of claim 21, wherein at least one elastomeric polyurethane essentially free of diene hydrocarbon and chlorine functionalities comprises a blend of at least two aqueous soluble, emulsifiable or dispersible polyurethanes having film properties with different modulus of elongation at the same percentage of elongation.

23. The flexible bundle of fibers of claim 2I, wherein said aqueous impregnating composition comprising one or more water soluble, emulsifiable or dispersible plasticizers.

24. The flexible bundle of fibers of claim 21, wherein said aqueous impregnating composition includes one or more silane coupling agents.

25. The flexible bundle of fibers of claim 21, wherein the polyurethane is curable to an extent of 10 weight percent or less on a dry solids basis.

26. The flexible bundle of fibers of claim 21, wherein said crosslinking material is an aqueous soluble, dispersible epoxy resin in an effective amount for partial curing of the curable polyurethane resin.

27. The flexible bundle of fibers of claim 21, wherein said aqueous impregnating composition further comprises an aqueous soluble, dispible and emusifiable, brominated epoxy resin.

28. The flexible bundle of fibers of claim 21, wherein the impregnating bundle is dried at an elevated temperature for a period of time to effect the partial cure of the impregnant in the bundle of fibers.

29. The flexible bundle of fibers of claim 21, wherein said crosslinking material is selected form monomeric or polymeric aldehyde condensate compounds, along with an acidic or basic catalyst in an effective amount of partial curing of the curable polyurethane resin.

30. The flexible bundle of fibers of claim 21, wherein said aqueous impregnating composition has as the aldehyde condensate resin a melamine formaldehyde resin with an acid catalyst.

31. The flexible bundle of fibers of claim 21, wherein said aqueous impregnating composition has a water soluble, emulsifiable or dispersible fire retardant.

32. The flexible bundle of fibers of claim 31, wherein said fire retardant in the aqueous impregnation composition is antimony trioxide.

33. The flexible bundle of fibers of claim 21, wherein said elastomeric polymer is selected from the group consisting of elastomeric polyurethanes, silicones, fluororubbers, polysulfide polymers, and polyethers, and wherein said aqueous impregnating composition has at least one water dispersible or emulsifiable diene-containing elastomer essentially free of vinyl pyridine repeating units present in an amount of the solids of the aqueous impregnating composition is present in a lesser amount than the elastomeric polymer.

34. The flexible bundle of fibers of claim 21, wherein the moisture content of the moisture reduced partially cured impregnating composition is in the range of about 1 to about 2 weight percent of the bundle.

35. The flexible bundle of fibers of claim 21, wherein said elastomeric, curable polyurethane is fully reacted without any free isocyanate groups.

36. The flexible bundle of fibers of claim 21, wherein said elastomeric polyurethane has film properties of hardness of about 10 Shore A to about 75 to 80 Shore D and an elongation on the order of 100 to 800%.

37. The flexible bundle of fibers of claim 21, wherein said moisture reduced residue of an aqueous chemical sizing composition is present in the bundle in an amount in the range of about 0.5 to about 5 weight percent of the treated fibers.

38. The flexible bundle of fibers of claim 21, wherein said amount of the mositure-reduced partially cured residue of the impregnating composition present is of greater than 5 weight percent of the bundle.

39. The flexible bundle of fibers of claim 21, wherein said elastomeric curable polyurethane is curable by the addition of monomers selected form the group consisting of diisocyante, polyols and epoxies, and curable moieties selected from the group consisting of hydroxyls, epoxies, ureas, amines, amides, olefinic groups and reactive methylene groups.

40. The flexible bundle of fibers of claim 21, wherein said elastomeric curable polyurethane is present in an aqueous emulsion or dispersion through the use of internal or external dispersing agents and emulsifiers.

41. The flexible bundle of fibers of claim 18, wherein the moisture content of the moisture reduced partially cured impregnating composition is in the range of about 1 to about 2 percent of the bundle.

42. The flexible bundle of fibers of claim 21, wherein said polyurethane is a reaction product of an isocyanate monomer and a monomer of organic compound having at least two active hydrogens selected from the group consisting of linear or branched polyester polyol, linear or branched polyether polyol.

43. The flexible bundle of claim 21, wherein said polyurethane is a polyurethane urea polymer.

44. a flexible bundle of glass fibers, comprising:
 (a) a plurality of glass fibers constituting a bundle, wherein said fibers have a moisture reduced residue of an aqueous non-starch-containing sizing composition comprising a 50/50 blend of a polyalkylene polyol and a polyoxyalkylene polyol, wherein said polyols having an average molecular weight from about 300 to about 12,000 and wherein said blend is present in an amount of about 0.5 to about 5 weight percent of the aqueous sizing composition, a silane coupling agent in an amount of about 0.1 to about 2 weight percent of the aqueous sizing composition, a cationic acidified fatty acid amide polyamine lubricant in an amount of about 0.01 to about 4 weight percent of the aqueous sizing composition, where the total solids of said aqueous sizing composition is in the range of about 3 to about 20 weight percent and the amount of said moisture reduced residue is present in an amount in the range of about 0.05 to about 5 weight percent of the bundle.
 (b) a moisture-reduced and at least partially cured residue impregnating the bundle of glass fibers, where the moisture reduced residue has a moisture content in the range of about 1 to about 2 weight percent of the bundle, and wherein the amount of said residue present is greater than 5 weight percent of the bundle, and wherein said residue results form the aqueous impregnating composition comprising:
  (1) at least one elastomeric, curable polyurethane that has film properties of hardness of about 10 Shore A to about 80 Shore D and film elongation of about 100 to 800 percent, wherein said polyurethane is water emulsifiable by containing ionic groups, hydrophilic polyether segments and by being emulsifiable with external emulsifying agents selected from nonionic, cationic, anionic and amphoteric zwitterionic to match the ionic character of said polyurethane,
  (2) an acidic or basic catalyst and at least one crosslinking material selected from the group consisting of water soluble, emulsifiable, and dispersible monomeric epoxy polymer and polymeric aldehyde condensate compound selected from the group consisting of hexakis (methoxymethyl melamine); melamine formaldehyde resin, urea formaldehyde resin, phenol formaldehyde resin, resorcinol formaldehyde resin in an effective amount to at least partially cure said polyurethane resin wherein said residue has a hardness in the range of 10 Shore A to about 80 Shore D and an elongation of about 100 to about 800 percent and a modulus at 500 percent elongation of about 500 to about 4,000 psi,
  (3) one or more water soluble, dispersible or emulsifiable plasticizers,
  (4) one or more silylated lubricants,
  (5) water in an effective amount to provide an impregnating coating composition for the bundle of glass fibers wherein said aqueous impregnating composition has a viscosity of up to 5 centipoise for kiss roll type coating application and up to around 10 to 20 centipoise at room temperature for die coating application wherein said polyurethane is used in a preemulsified form having a solids content of up to 50 weight percent and wherein said polyurethane is the predominant constituent of the solids of the aqueous impregnating composition.

45. The flexible bundle of glass fibers of claim 44, wherein said polyurethane comprises the reaction product of an isocyanate monomer and a monomer of an organic compound having at leat two active hydrogens selected from the group consisting of linear or branched polyester polyol and linear or branched polyether polyol.

46. Flexible bundle of claim 44, wherein said polyurethane is a polyurethane urea polymer.

47. The flexible bundle of glass fibers of claim 44, wherein said aqueous impregnating composition comprises;
 a butyl benzyl phthalate plasticizer, a trixylyl phosphate plasticizer, a polyoxyethylene sorbitan monolaurate emulsifier, water, an aqueous dispersion comprising a brominated expoxy polymer and a polyamine curing agent and an antimony trioxide fire retardant.

* * * * *

UNITED STATES PATENT AND TRADEMARK OFFICE
CERTIFICATE OF CORRECTION

PATENT NO. : 4,762,750
DATED : August 9, 1988
INVENTOR(S) : Mikhail M. Girgis et al It is certified that error appears in the above-identified patent and that said Letters Patent is hereby corrected as shown below:

In the References Cited section, cited U.S. Patents 3,650,818 (Marzocchi et al) and 4,358,502 (Dunbar) were not included.

Signed and Sealed this

Twenty-fifth Day of July, 1989

Attest:

DONALD J. QUIGG

Attesting Officer

Commissioner of Patents and Trademarks